March 3, 1959 E. F. W. ALEXANDERSON 2,876,408
MOTOR CONTROL SYSTEM
Filed July 27, 1954 3 Sheets-Sheet 1
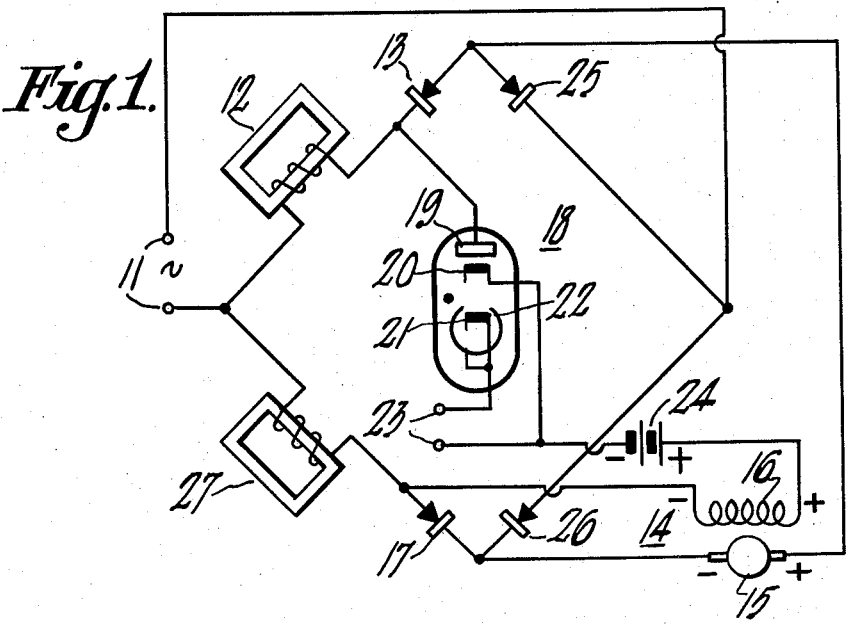
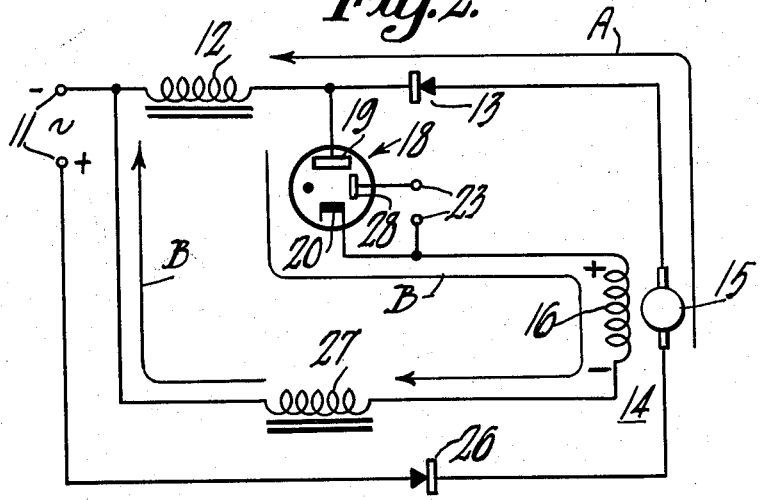
INVENTOR.
ERNST F. W. ALEXANDERSON
BY J. L. Whittaker
ATTORNEY

INVENTOR,
ERNST F. W. ALEXANDERSON
BY
ATTORNEY

United States Patent Office 2,876,408
Patented Mar. 3, 1959

2,876,408

MOTOR CONTROL SYSTEM

Ernst F. W. Alexanderson, Schenectady, N. Y.

Application July 27, 1954, Serial No. 446,104

7 Claims. (Cl. 318—345)

The present invention relates to an improved motor control system and in particular to an improved electronic motor control system.

The problem of varying the speed of a motor fed by alternating current power is old. The type of speed control system which comprises a motor generator feeding a direct current motor is disadvantageous in that its cost is excessive and it is inconvenient to install the motor generator at the place of operation. Another solution which is less extensively used is an alternating current commutator with brush shift control. Still another solution is a thyratron or ignitron feeding a direct current motor. The use of this latter system is limited by the bulkiness and the high maintenance cost of the rectifier.

It is an object of the present invention to provide an improved type of variable speed control for a direct current motor energized from an A.-C. source which has important advantages over such prior control systems.

It is another object of the present invention to provide a variable speed motor control for an A.-C. energized motor which is both reversible in direction and wherein the transition from forward to reverse rotation is smooth and may be precisely controlled.

It is still another object of the present invention to provide an improved electronic motor control system utilizing the advantageous characteristics of the germanium rectifier and the "plasmatron."

With the above objects in view, various embodiments of the present invention comprise the combination with a direct current motor of a rectifier circuit including a by-pass circuit, the output of the rectifier circuit supplying the armature of the motor and the output of the by-pass circuit supplying the field winding of the motor. The by-pass circuit is adjustable and is so connected that the voltage delivered by the rectifier to the armature is a function of the current through the by-pass circuit and the field winding. Thus, an increase of current through the field winding at the same time produces a decrease in voltage across the armature. Similarly, a decrease of current through the field winding causes an increase in voltage across the armature. The result is variable speed control of the motor over a very wide range.

In a preferred embodiment of the invention, a germanium rectifier bridge circuit is employed. Germanium rectifiers have the important advantage of great ruggedness, high current passing ability, small bulk and very low maintenance costs.

The by-pass circuit preferably employs an electron discharge device known as the "plasmatron," which has fundamentally new characteristics.

In a preferred form of the invention saturable reactor means in circuit with the "plasmatron" acts as a magnetic amplifier.

The invention will be described in greater detail by reference to the following description taken in connection with the accompanying drawing in which:

Fig. 1 is a schematic circuit diagram of one embodiment of a variable speed control system according to the present invention;

Fig. 2 is a simplified drawing of a portion of Fig. 1;

In the various figures similar reference characters refer to similar elements.

Figure 3:
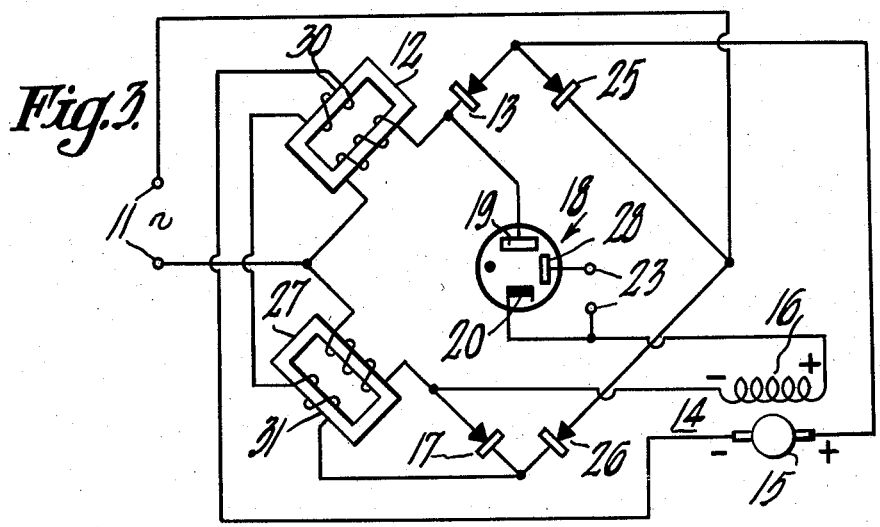
Fig. 3 is a schematic circuit diagram of a second embodiment of the present invention.

Referring to the drawing and in particular to Fig. 1, a source of alternating current power 11 is connected to a bridge rectifier circuit. Each arm of the rectifier circuit includes a semi-conductive, preferably germanium, rectifier element 13, 17, 25 and 26, respectively. Two of the arms of the bridge include saturable iron core reactors 12 and 27 respectively. The output circuit of the bridge rectifier supplies voltage to the armature 15 of direct current motor 14.

The circuit of Fig. 1 also includes a by-pass circuit including "plasmatron" 18, biasing battery 24 and field winding 16 of motor 14.

The "plasmatron" is a gas-filled tube with a controllable conductivity at voltages so low that the "plasmatron" functions substantially as a short circuit. In this the "plasmatron" differs radically from the vacuum tube which functions in the range of high voltage and low current. It also differs from the thyratron which is controllable only in the sense that it can be triggered to close a circuit but not to open the circuit.

Further details of the "plasmatron" tube and its characteristics are given in the article titled, "The Plasmatron, a Conductivity Controllable Gas Discharge Developmental Tube," by E. O. Johnson and W. M. Webster, on page 645 of the June 1952 issue of Proceedings of the IRE and in Patent No. 2,619,622 titled "Gaseous Electron Tube Circuits" issued on November 25, 1952 to E. O. Johnson.

The "plasmatron" has an anode 19, main cathode 20, auxiliary cathode 21, and shield 22 for the auxiliary cathode. The conductivity of the "plasmatron" is controlled by a control circuit (not shown) connected across terminals 23 of the "plasmatron." The control circuit may include an electron discharge device the anode of which is connected to the auxiliary cathode and the cathode of which is connected to the main cathode. A signal applied to the control element of this discharge device effectively modulates the ionization current which will be drawn between the auxiliary cathode 21 and main cathode 20 of the "plasmatron." A more detailed explanation of this phenomenon may be found in the Johnson patent referred to above.

Figure 2 is a simplified drawing of the circuit of Fig. 1 and illustrates the operation of the circuit for one half cycle of input alternating current. In this drawing and in subsequent figures illustrating other embodiments of the invention the auxiliary cathode 21 and its shield 22 are illustrated as a single member 28 and this member is hereinafter referred to as the control element of the "plasmatron." In operation, during an input half cycle of the polarity indicated, current passes through rectifier 26, armature 15, rectifier 13, and saturable reactor 12 in the direction indicated by arrow A. At the same time current passes through by-pass circuit including "plasmatron" 18, field winding 16, and saturable reactor 27 in the direction indicated by arrow B. When the conductivity of "plasmatron" 18 is increased so that, for example, it presents an effective short circuit, there will be maximum current flow through the by-pass circuit including field winding 16. Reactor 27 is thereby premagnetized so that it acts as a current limiting reactor during the next half cycle. At the same time, since most of the current is passing through the by-pass circuit there is maximum current through the field winding of the motor, maximum voltage across saturable reactor 12 because of its premagnetization in the previous half cycle, and therefore minimum voltage across armature 15. Motor 14 is, in effect, a series wound motor and as is well known the speed of the motor is minimum when the voltage across its armature is minimum and the current through its field winding is maximum. When the "plasmatron" is adjusted to maximum conductivity the above conditions are met and therefore the motor is either at standstill or operating at very low speeds.

When the conductivity of the "plasmatron" is decreased, that is, its impedance increased, the current flow through the by-pass circuit including field winding 16 decreases. Decrease in current flow through reactor 27 decreases its premagnetization and causes an increase in the voltage across its terminals during the next half cycle. Decrease in current flow through the by-pass circuit has reduced the premagnetization of saturable reactor 12 which now saturates so that there is minimum voltage drop across reactor 12. The reduction in voltage drop across reactor 12 results in increased voltage output of the rectifier and accordingly, increased voltage across armature 15. Summarizing, when the "plasmatron" conductivity is decreased, current flow through the field winding of motor 14 decreases and the voltage across armature 15 of the motor increases resulting in increased motor speed.

The operation of the above circuit is the same during the second half cycle of input alternating current. During this interval, however, the rectifier circuit includes germanium rectifiers 25 and 17 rather than 26 and 13 and the positions of saturable reactors 12 and 27 are reversed, that is, reactor 12 is in the by-pass circuit and reactor 27 in the rectifier circuit.

It can be readily seen that in the circuit above the saturable reactor in combination with the plasmatron acts as a magnetic amplifier. The circuit operates somewhat like a magnetic amplifier with negative current feedback. This type of operation in which the degree of feedback is controlled enables the speed of the motor to be controlled over a very wide range.

Fig. 3 illustrates a second embodiment of the present invention which is identical to the circuit of Fig. 1 except that each saturable reactor includes a secondary winding 30, 31 respectively, both windings being in series with the armature 15 of the motor. The secondary windings have a relatively small number of turns compared to the primary windings. The object of this arrangement is to introduce additional saturation current to the reactors so that more current can be diverted by the "plasmatron" and used for field excitation of the motor. Thus a positive feedback is provided which must be overpowered by the controlled negative feedback. The range of speed control can thereby be extended.

In operation of the circuit of Fig. 3, the motor operates in two speed ranges. In the first range the rectifier output voltage, that is the voltage placed across the armature of the motor, is controlled from zero voltage to full voltage. In the second range, the voltage across the armature remains substantially constant at full voltage but the speed of the motor is adjusted by regulating the amount of current through the field winding of the motor. Both of these ranges are covered by the continuous control range of the "plasmatron." Thus, when the "plasmatron" is adjusted to maximum conductivity so that it presents substantially a short circuit, current through the by-pass circuit including the "plasmatron" and field winding is a maximum resulting in maximum voltage drop across reactors 12 and 27. Maximum voltage drop across the reactors results in zero or very little output of the rectifier and therefore minimum voltage drop across armature 15. The conditions for very low or zero motor speed, that is, low armature voltage and maximum field winding current, are accordingly satisfied.

As the conductivity of the "plasmatron" is decreased, the current through the by-pass circuit is decreased and the voltage across the armature is increased in the manner already indicated in connection with Fig. 2. The positive current feedback through secondary windings 30 and 31 introduces additional saturation to the reactors. The result is that the reactors are shortly fully saturated and the output voltage of the rectifier and therefore the voltage across the armature 15 attains a high constant value. This is the end of the first range of control. Further decrease in the conductivity of the "plasmatron" results in less current through the field winding 16 of the motor and accordingly in further reduction in the speed of the motor.

As a further illustration of the type of operation of the embodiment of Fig. 3, assume that the normal operating speed of the motor is 1600 revolutions per minute. The first range of control would control the operation of the motor from zero revolutions per minute to 1600 revolutions per minute and the second range of control would control the range of the motor from 1600 revolutions per minute to its maximum limit.

Figure 4:
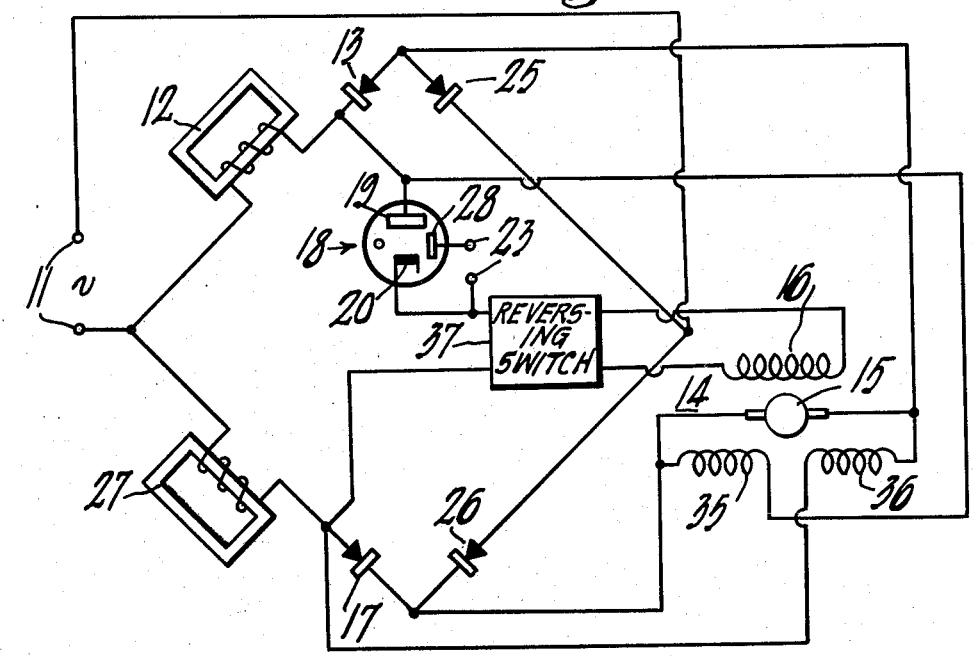
Fig. 4 is a schematic circuit diagram of a third embodiment of the present invention.

Fig. 4 illustrates another embodiment of the present invention which operates on principles similar to those outlined in connection with Fig. 3. The motor is operated in two ranges just like the embodiment of Fig. 3, however, the additional saturation of reactors 12 and 27 is provided by a pair of shunt field windings 35, 36 which are effectively connected in series with the reactor windings. Thus a direct current flows from the positive motor terminal successively through shunt field winding 35, reactor winding 12, reactor winding 27, shunt field winding 36 to the negative motor terminal. This current flow produces the necessary ampere turns of motor field and saturation of the reactors. The shunt field windings 35, 36 should be so prepositioned that they give the minimum field strength needed at maximum motor speed. The range of higher field strength required for lower speed is then regulated by the "plasmatron" but at maximum speed the "plasmatron" carries no current.

It will be apparent from the foregoing discussion to those skilled in the art that the systems of control shown in Figs. 2 and 3 may be used in combination.

In the foregoing discussion it has been assumed that the speed control is designed for unidirectional rotation. The direction of control can be reversed by reversing the motor field or motor armature. An arrangement for reversing the motor field is illustrated in Fig. 4 and includes motor reversing switch 37 located in the by-pass circuit. It is apparent that the same effect can be achieved by locating a motor reversing switch in the armature circuit. Either of these types of motor reversal control may be used in the circuits of Figs. 2 and 3.

Figure 5:
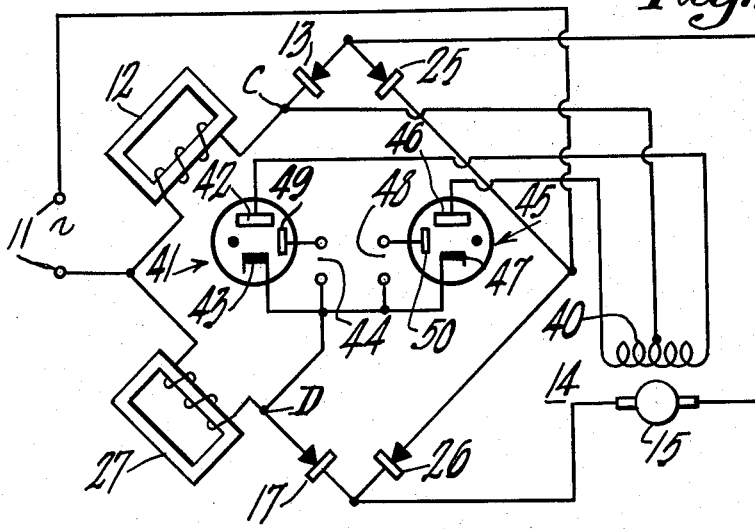
Fig. 5 is a schematic circuit diagram of a fourth embodiment of the present invention.

The principles of the present invention are also applicable to an important group of motor applications known as positioning controls with feedback circuits. The positioning controls require a smooth and delicate transition from forward to reverse rotation. Fig. 5 illustrates a push-pull control of this type. The circuit is similar to the one illustrated in Fig. 1 except that the field winding 40 of the motor is center tapped and a pair of "plasmatrons" 41, 45 are employed for controlling the direction of rotation of the motor. "Plasmatron" 41 comprises an anode 42, main cathode 43, control element 49, and input circuit 44; "plasmatron" 45 comprises an anode 46, main cathode 47, control element 50 and input circuit 48. The remaining elements are similar to those of Fig. 1 and bear the same identifying numerals.

Figure 6:
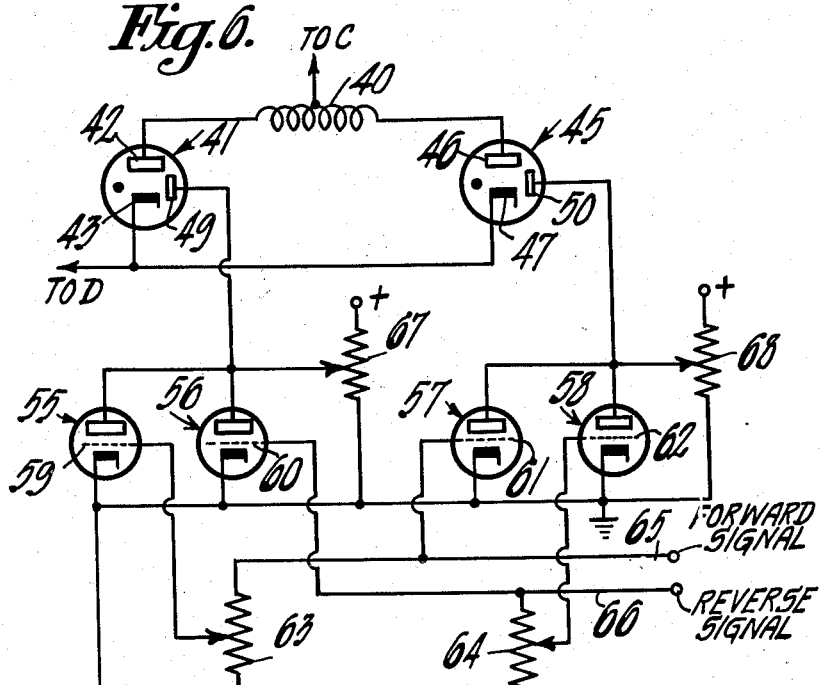
Fig. 6 is a schematic diagram of a circuit for controlling the operation of the circuit illustrated in Fig. 5.

Fig. 6 illustrates a typical circuit for controlling the conductivity of "plasmatrons" 41 and 45. The circuit includes a plurality of vacuum tubes 55—58, respectively, each having a control grid 59—62, respectively, and each pair of tubes being connected to a dropping resistor 67, 68, respectively. The conductivity of the tubes is controlled by a forward signal supplied over line 65 and potentiometer 63 and a reverse signal supplied over line 66 and potentiometer 64.

In the neutral position, "plasmatrons" 41 and 45 represent substantially short circuits and the currents in the two halves of the field winding neutralize each other so that the motor torque is zero. Most of the rectified current is by-passed so that the reactors limit the rectifier output voltage to a low value.

The conductivity of the forward "plasmatron" 41 is controlled by tubes 55 and 56 and the conductivity of the reverse "plasmatron" 45 is controlled by the tubes 57 and 58. The control grids 59 and 61 of tubes 55 and 57 are controlled by the forward signal and the control grids of tubes 56 and 58 are controlled by the reverse signal. The grids of all tubes are so biased that a neutral signal cuts off the anode currents.

A small increase in forward signal amplitude causes a correspondingly low anode current to flow in tube 55. The same signal is applied to tube 57 which controls the reverse "plasmatron," however, this tube has a much more sensitive grid circuit. The result is that the conductivity of the reverse "plasmatron" is suppressed even by the weak signal. The current in the left half of the motor field winding is therefore suppressed and the motor delivers a forward torque. A further increase in the forward signal amplitude will then control the forward motor operation over its full speed range as explained in connection with Figs. 1, 2 and 3.

An increase of the reverse signal amplitude produces an effect corresponding to the above effect but in the opposite direction. Control tube 56 suppresses the conductivity of the forward "plasmatron" 41, whereas control tube 58 controls the motor speed over the reverse speed range.

In the embodiment of the invention shown in Figs. 5 and 6, it is desirable that the sum of the by-pass currents decrease as the difference in current flow through the two "plasmatrons" increases. However, some circuit misadjustment does not make the system inoperative or unstable. A small difference in forward signal amplitude, for example, will still produce a forward field and a forward torque even if the armature current is decreased (as a result of increased current flow through the by-pass circuit) instead of increased as it should be.

In the examples above a single-phase power supply is employed. It will be apparent to those skilled in the art that the system is equally applicable to polyphase operation.

In the system described, a diode "plasmatron" is employed. It will be understood, however, that "plasmatron" tubes employing a control grid such as those illustrated in Figs. 2–6 of the Johnson patent may also be used for the same purpose.

What is claimed is:

1. A motor control system comprising, in combination, a direct current motor having a field winding and an armature; a source of alternating current power; a bridge rectifier circuit for rectifying said alternating current, said circuit including a pair of input terminals connected across said source and a pair of output terminals connected across said armature for applying direct voltage to said armature; a first saturable reactor located in an arm of said bridge circuit adjacent one of the input terminals thereto; a second saturable reactor located in another arm of said bridge circuit adjacent said one input terminal thereto; a "plasmatron" discharge device; a by-pass circuit connected across said two saturable reactors, said by-pass circuit comprising said field winding and said "plasmatron" discharge device connected in series, said "plasmatron" discharge device being connected in such sense as to permit current to flow through said by-pass circuit and one of said reactors at the same time as current flows through the other of said reactors and said armature, whereby adjustment of the conductivity of said "plasmatron" discharge device controls the amount of current diverted through said by-pass circuit to said field winding and simultaneously controls the output voltage of said rectifier circuit applied across said armature.

2. A motor control system as set forth in claim 1, wherein said bridge rectifier circuit includes a germanium diode in each arm thereof.

3. A motor control system as set forth in claim 1, and further including a pair of windings, one located on each of said saturable reactors, in series with said armature whereby additional saturating current is introduced by the output of said bridge rectifier circuit to said saturable reactors thereby extending the range of control of said system.

4. A motor control system as set forth in claim 1, and further including a pair of shunt field windings operatively associated with said motor and connected across said by-pass circuit, whereby said shunt windings introduce additional saturating current to said saturable reactors.

5. A motor control system comprising, in combination, a direct current motor having field winding means and an armature; a source of alternating current power; a bridge rectifier circuit for rectifying said alternating current, said circuit including a pair of input terminals connected across said source and a pair of output terminals connected across said armature for applying direct voltage to said armature; a first saturable reactor located in an arm of said bridge circuit adjacent one of said input terminals; a second saturable reactor located in another arm of said bridge circuit adjacent said one input terminal; a pair of unidirectionally conducting current controlling means; a by-pass circuit connected across said two saturable reactors, said by-pass circuit comprising said field winding means and said pair of current controlling means, said current controlling means being connected in such sense as to permit current to flow through said by-pass circuit and one of said reactors at the same time as current flows through the other of said reactors and said armature, said current controlling means being connected to opposite ends of said field winding means, respectively, whereby when more current flows through one of said current controlling means than the other, current flows through said field winding means in one direction, and when the reverse is true current flows through said field winding means in the other direction.

6. A motor control system comprising, in combination, a direct current motor having a field winding and an armature; a source of alternating current power; a bridge rectifier circuit for rectifying said alternating current, said circuit including a pair of input terminals connected across said source and a pair of output terminals connected across said armature for applying direct voltage to said armature; a first saturable reactor located in an arm of said bridge circuit adjacent one of the input terminals thereto; a second saturable reactor located in another arm of said bridge circuit adjacent said one input terminal thereto; a unidirectionally conducting current controlling means; a by-pass circuit connected across said two saturable reactors, said by-pass circuit comprising said field winding and said current controlling means connected in series, said current controlling means being connected in such sense as to permit current simultaneously to flow through said by-pass circuit and one of said reactors, and the other of said reactors and said armature, whereby adjustment of the conductiivty of said current controlling means controls the amount of current diverted through said by-pass circuit to said field winding and simultaneously controls the output voltage of said rectifier circuit applied across said armature.

7. A motor control system comprising, in combination, a direct current motor having a field winding means having a center tap and a pair of end terminals, and an armature; a source of alternating current power; a bridge rectifier circuit for rectifying said alternating current, said circuit including a pair of input terminals connected across said source and a pair of output terminals connected across said armature for applying direct voltage to said armature; a first saturable reactor located in an arm of said bridge circuit adjacent one of the input terminals thereto; a second saturable reactor located in another arm of said bridge circuit adjacent said one input terminal thereto; a pair of unidirectionally conducting current controlling devices; a by-pass circuit connected across said two saturable reactors, said by-pass circuit comprising said field winding means, one of said current controlling devices connected at one end to one end tap of said field winding means, and the other of said current controlling devices connected at said one end to the other end tap of said field winding means, the center tap of said field winding means connected to one of said reactors, and the other ends of said current controlling devices being connected to the other of said reactors, said current controlling devices being connected in such sense as to permit current to flow through said by-pass circuit, field winding means and one of said reactors at the same time as current flows through the other of said reactors and said armature, whereby adjustment of the relative conductivity of said two current controlling devices controls the direction of current through said field winding means and adjustment of the total conductivity of said two current controlling devices controls the amount of current diverted through said by-pass circuit to said field winding means and simultaneously controls the output voltage of said bridge rectifier circuit applied across said armature.

No references cited.